Feb. 15, 1944.    J. OGDEN    2,341,943
WELDING TRANSFORMER
Filed April 11, 1941    2 Sheets-Sheet 1
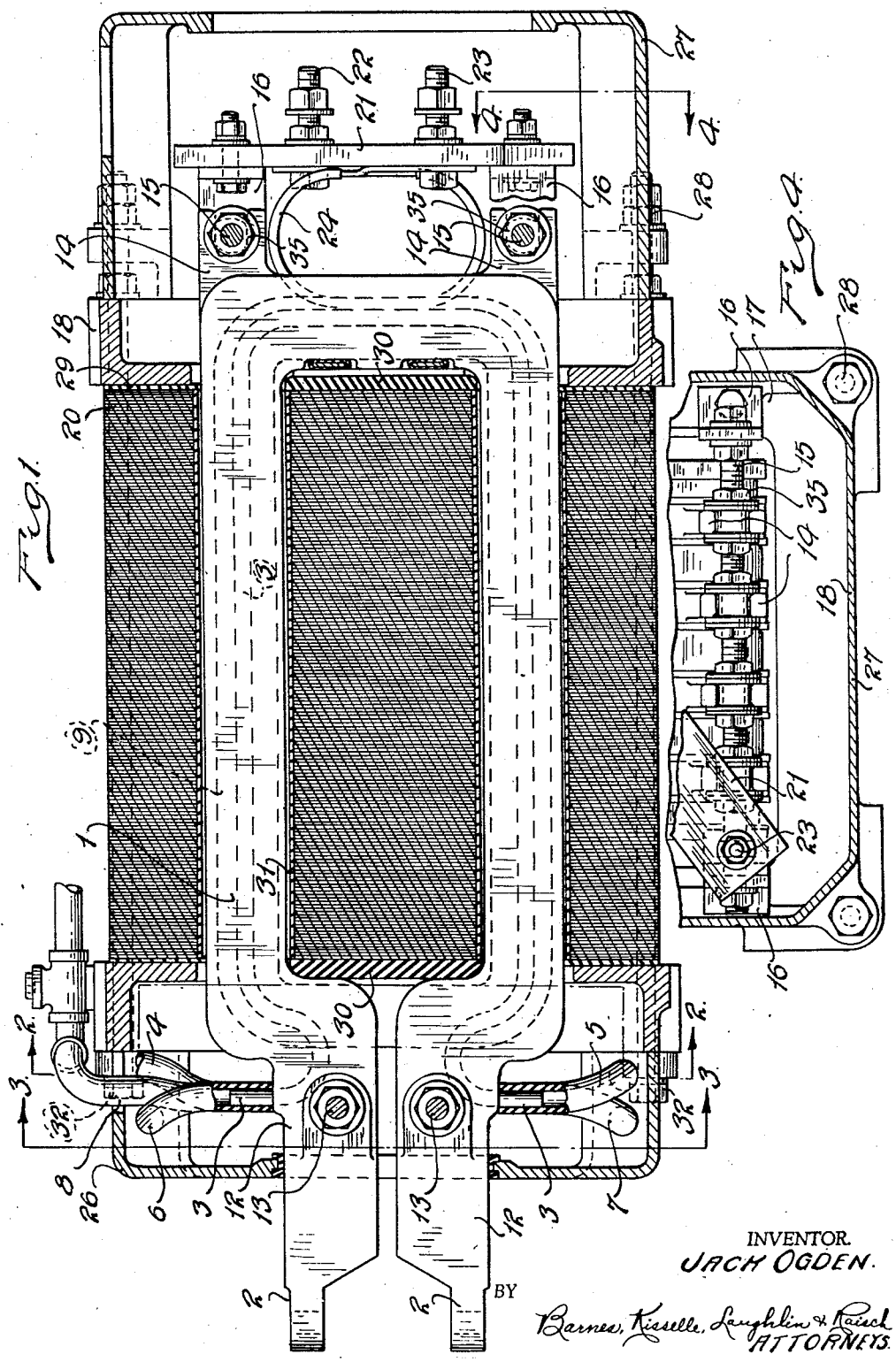
INVENTOR.
JACK OGDEN.
BY
Barnes, Kisselle, Laughlin & Raisch
ATTORNEYS

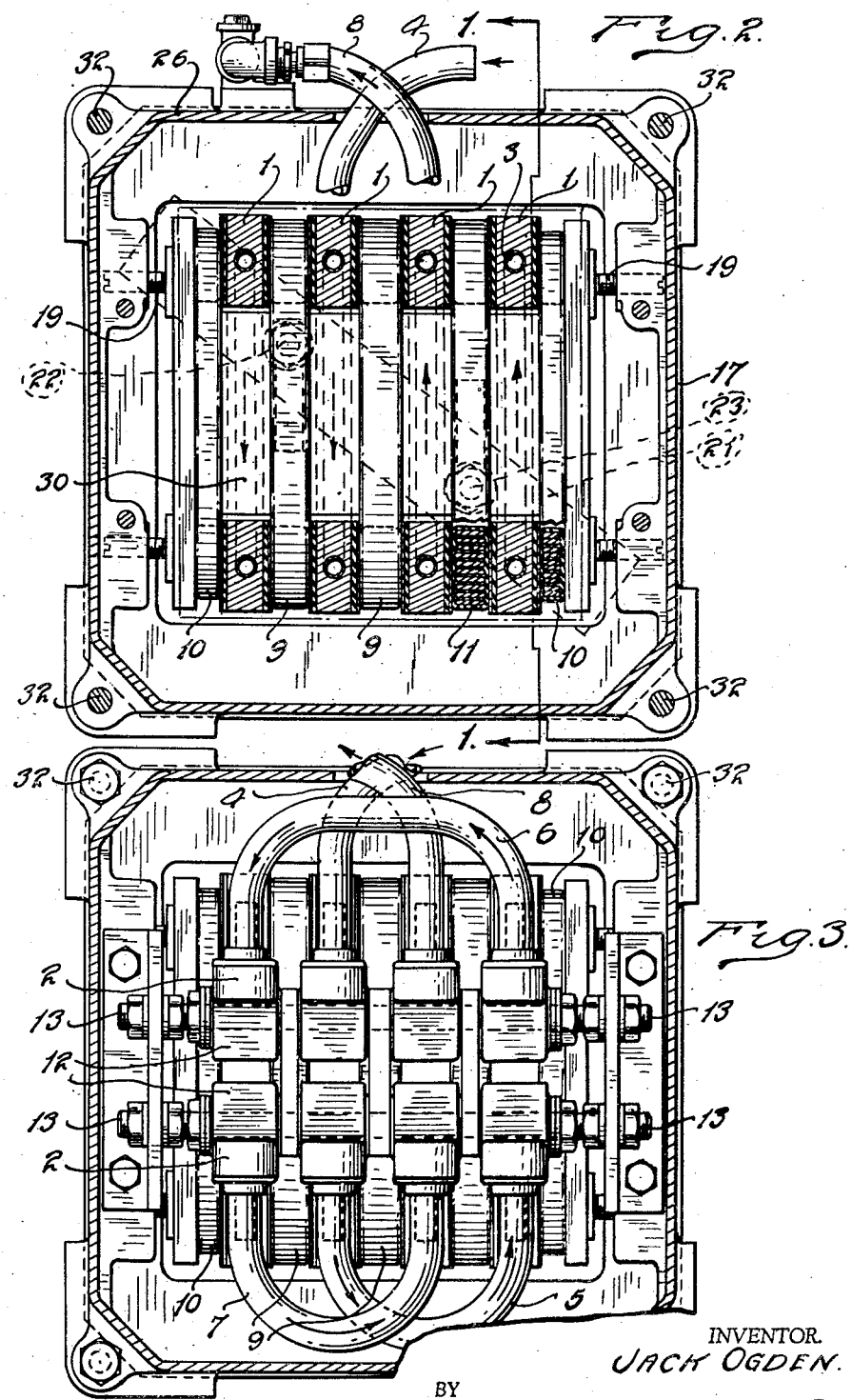

Patented Feb. 15, 1944

2,341,943

UNITED STATES PATENT OFFICE 2,341,943

WELDING TRANSFORMER

Jack Ogden, Huntington Woods, Mich., assignor to General Motors Corporation, Detroit, Mich., a corporation of Delaware Application April 11, 1941, Serial No. 388,069

4 Claims. (Cl. 175—356)

This invention relates to transformers, particularly a transformer for supplying electrical energy to welding electrodes. In the Biederman and Harder application 282,640 on multiple spot welding, this applicant claims a new method of welding which employs electrodes arranged in groups. Each group has a plurality of entirely separated and individual secondary circuits, inductively related with a single primary circuit.

It is the object of the present invention to afford an efficient transformer in a properly balanced relation inductively with these individual secondaries so that each secondary will get its proper proportion of current.

In the drawings:

Fig. 1 is a longitudinal section through the transformer taken on the line 1—1 of Fig. 2.

Figs. 2, 3 and 4 are sections taken on the corresponding section lines of Fig. 1.

Referring to Fig. 2 it will be seen that there are four secondaries 1. Each of these secondaries is a loop (see Fig. 1). Each end of the loop is provided with a lug 2 to which the ends of the conductors leading to the electrodes can be fastened. Each of the secondaries has a tube case to provide a water passage 3 to permit the flow of a cooling fluid. The water enters through the conduit 4, passes through the second secondary, thence through the hose 5 to the fourth secondary, from the fourth secondary to the first secondary via the hose 6; thence from the first secondary via hose 7 to the third secondary and then return to the hose by means of conduit 8. These hose couplings are located at the lower ends of the secondaries (see Fig. 1).

Between each of the secondaries is an insulated winding of the primary circuit. Each of these windings is designated 9. Three of these windings are full size. Two of the windings—the end ones—are half-size windings. These are designated 10. It will be noticed that each of the windings 9 is made up of 10 turns. (See the cross section of the winding in Fig. 2.) These coils are designated 11 and are each insulated from the other. Each of the half-size windings is made up of 5 turns, but each turn has a cross section of only half the width of the turn in the larger winding but twice as thick because each winding is made up of two half width strips. So one has only five turns but of the same cross section area as the cross sections of the turns of the larger windings. By such a grouping and shaping of windings the inductive fields at the ends of the group of secondaries are equalized. Previously it has been customary to employ five full-sized windings of the primary for the four individual secondaries, but it was found that this produced unbalanced currents for the end secondaries had one whole primary in inductive relation on one side and a half primary coil on the other side. I have balanced the transformer by making the primary conductor of the end primary units of just half the cross section. By grouping two conductors together I have not changed the total cross sectional arrangement of the conductor so as to change the resistance to the flow of the current. However, by paralleling the 10 half-section conductors in groups of two I have kept the primary circuit in the same relative position with respect to the secondary circuits, so as not to in any way alter the inductive capacity of the primary with respect to the secondary.

Another feature of my improvement is that I have built the transformer so that the coils are properly supported in spaced relation by a frame. Note that the free ends 12 of the secondaries are bolted together by the rods 13. Note that at the top of the secondaries there are lugs 14. Screw shafts 15 pass through these lugs 14 and at their ends are anchored by the upright standards 16. These standards rest on the shelf 17 of the upper transformer frame 18. The individual secondaries are spaced and held to the standards by means of jamb nuts 35 on the screw shaft 15. The individual and insulated primary winding units 9 are pinched in between the secondary loops when these are drawn together with the jamb nuts.

Between the upper transformer frame 18 and the lower one 19 are located a plurality of laminae which form the core of the transformer. These laminations may be packed in any suitable way. Each lamination is usually made up of sections which fit together between the legs of the secondaries and primaries and also fit around them. But inasmuch as this is common practice, this is not shown in detail in the drawings. At the top a diagonal bar of insulating material 21 is provided and this carries a pair of binding posts 22 and 23 for connecting the primary circuit 24 with the lead in wires of the transformer. The cap 26 is bolted over the bottom of the transformer by screws 32 and the cap 27 over the top by means of the tie rods 28. These tie rods also serve to clamp the upper and lower frames on to the stack of laminations, thereby assembling the transformer together. Insulating material 29 in the form of insulating board is inserted between the top and bottom frames and laminations. Heavier insulating material 30 is inserted between the top and bottom of the lamination stack and the end portions of the secondaries. Insulating board 31 is inserted between the edges of the laminations and the legs of the primary and secondary coils.

Of it I claim:

1. A welding transformer having in combination a single primary circuit and a plurality of separate and independent secondary circuits or loops, the primary circuit making a plurality of loops connected in series and the individual secondary circuits being inserted between the primary loops, the primary circuit having at each end of the series of individual secondary circuits a half-sized loop to equalize the inductive field for the secondary circuits and induce equal secondary currents in each secondary circuit.

2. In a welding transformer, a single primary circuit arranged to provide a plurality of units or loops connected in series, each unit or loop comprising a plurality of windings or coils, independent and separate secondaries, one located between each two primary units, the primary units between the secondaries being full-sized units and the primary units at the ends of the secondaries being half units to equalize the inductive field for the secondaries and the currents in the secondaries.

3. A welding transformer having in combination a single primary circuit and a plurality of separate and independent secondary circuits, the primary circuit formed into a plurality of loops in series, and independent secondary circuits, one being inserted between each two primary loops, the primary circuit having at each end of the series of individual secondary circuits a half-sized loop to equalize the inductive field for the secondary circuits.

4. In a welding transformer, a single primary circuit arranged to provide a plurality of units or loops connected in series, each unit comprising a plurality of windings or coils, independent secondaries unconnected and located one between each two primary units, the primary units between the secondaries being full-sized units and the primary units at the ends of the secondaries being half units to equalize the inductive field for the secondaries, the full-sized primary unit comprises a plurality of insulated windings of a flat strip, the half-sized winding comprises a strip of double thickness and half the cross sectional width but half the number of windings.

JACK OGDEN.